United States Patent
Bauwelinck et al.

(10) Patent No.: US 8,432,940 B2
(45) Date of Patent: Apr. 30, 2013

(54) COMMUNICATION SYSTEM OVER A POWER LINE DISTRIBUTION NETWORK

(75) Inventors: Johan Bauwelinck, Temse (BE); Els De Backer, Schellebelle (BE); Cedric Mélange, Kortrijk (BE); Jan Vandewege, Mariakerke (BE)

(73) Assignee: IMEC, Leuven (BE)

( * ) Notice: Subject to any disclaimer, the term of this patent is extended or adjusted under 35 U.S.C. 154(b) by 0 days.

(21) Appl. No.: 12/101,108

(22) Filed: Apr. 10, 2008

(65) Prior Publication Data

US 2008/0310456 A1 Dec. 18, 2008

Related U.S. Application Data

(60) Provisional application No. 60/911,013, filed on Apr. 10, 2007, provisional application No. 60/946,060, filed on Jun. 25, 2007.

(30) Foreign Application Priority Data

Sep. 13, 2007 (EP) ..................................... 07116365

(51) Int. Cl.
*H04J 1/00* (2006.01)
*H04J 1/02* (2006.01)

(52) U.S. Cl.
USPC ............................................ 370/497; 370/488

(58) Field of Classification Search .................. 370/480, 370/497, 488; 375/346, 350; 455/150.1, 455/179.1, 182.3, 183.1, 296, 307, 154.1, 455/188.1, 161.1; 381/98, 99
See application file for complete search history.

(56) References Cited

U.S. PATENT DOCUMENTS

| 7,113,557 | B2 * | 9/2006 | Kaku et al. | 375/346 |
|---|---|---|---|---|
| 7,257,128 | B2 | 8/2007 | Mestdagh | |
| 2002/0016158 | A1 * | 2/2002 | Shibuya et al. | 455/232.1 |
| 2002/0109585 | A1 | 8/2002 | Sanderson | |
| 2002/0151287 | A1 * | 10/2002 | Lindquist et al. | 455/183.1 |
| 2003/0002694 | A1 * | 1/2003 | Thiele | 381/99 |
| 2003/0058041 | A1 * | 3/2003 | Koizumi | 330/51 |
| 2004/0171361 | A1 * | 9/2004 | Vasanth et al. | 455/140 |
| 2004/0212481 | A1 * | 10/2004 | Abraham | 340/310.01 |
| 2008/0204148 | A1 * | 8/2008 | Kim et al. | 330/306 |

FOREIGN PATENT DOCUMENTS

WO  2004091113 A1  10/2004

OTHER PUBLICATIONS

Extended European Search Report, Application No. EP 07116365.3.
European Search Report of EP 08154446.2 (Jul. 24, 2008).

(Continued)

*Primary Examiner* — Michael Thier
*Assistant Examiner* — Feben M Haile
(74) *Attorney, Agent, or Firm* — McDonnell Boehnen Hulbert & Berghoff LLP

(57) ABSTRACT

The present disclosure provides a system for receiving signals over a power line distribution. Typically, problems of noise and interference are being solved at the receiver side. Systems of the present disclosure, however, are not limited to the receiver-side solution. Systems according to the present disclosure may also be used at the transmitter side. The receiver comprises a high pass filter, a preselect crossover filter, and an analog front-end receiver architecture.

18 Claims, 4 Drawing Sheets

OTHER PUBLICATIONS

Intellon, "Homeplug AG Technology Overview", 2005.
S. Dell'Aera and T. Riley, "Sampling IF Filters and the Return of the Superheterodyne Receiver", Microwave Journal, Nov. 2005.
D. Johns and K. Martin, "Continuous Time Filters," Analog Integrated Circuit Design, John Wiley & Sons, 1997, p. 574-647, ISBN 0-471-14448-7.
F. Krummenacher et al., "A 4 MHz CMOS Continuous-Time Filter with On-Chip Automatic Tuning," IEEE Journal of Solid-State Circuits, vol. 23, No. 3, Jun. 1988.
J. Silva-Martinez et al., "A 10.7-MHz 68-dB SNR CMOS Continuous-Time Filter with On-Chip Automatic Tuning," IEEE Journal of Solid-State Circuits, vol. 27, No. 12, Dec. 1992.

* cited by examiner

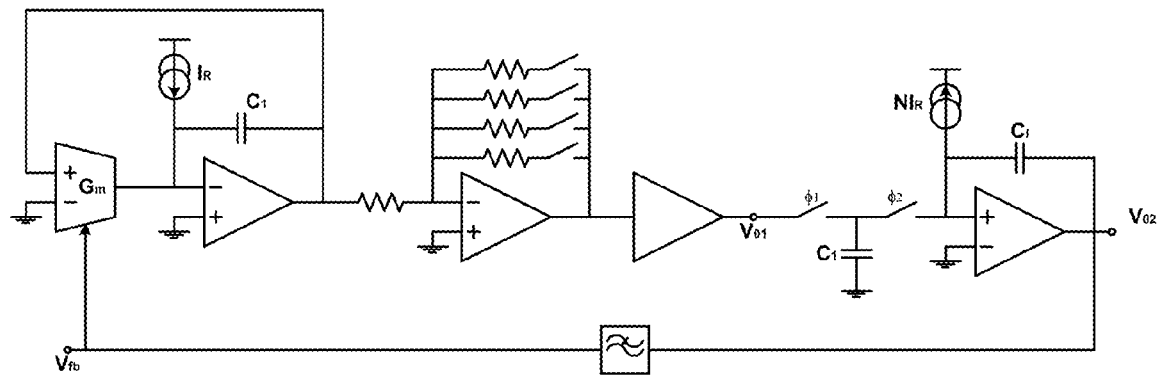
Fig. 7
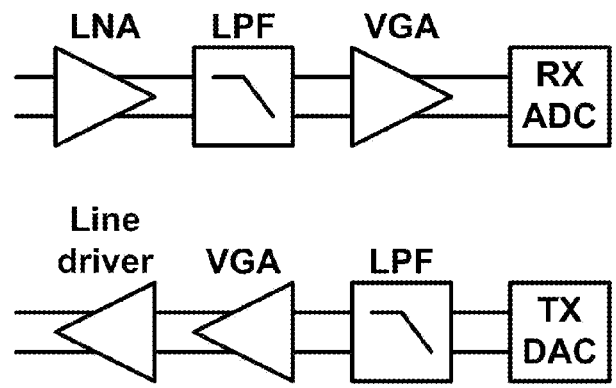
Fig. 8: PRIOR ART

COMMUNICATION SYSTEM OVER A POWER LINE DISTRIBUTION NETWORK

This application claims the priority of U.S. Provisional Patent Application Nos. 60/911,013 (filed Apr. 10, 2007) and 60/946,060 (filed Jun. 25, 2007), and the priority of European Patent Application No. EP 07116365.3 (filed Sep. 13, 2007). All of these priority documents are incorporated by reference in their entirety.

FIELD

The present invention relates to the field of communication systems. More particular, the present invention is part of a system for broadband communication over a power line distribution network.

BACKGROUND

Power line communication systems are becoming more and more widespread. Many different systems and standards are developed. As more and more systems will be deployed, co-existence becomes increasingly important. Undoubtedly, Frequency Division Multiplexing (FDM) is the most straightforward way to achieve co-existence between different systems. Different communication channels are allocated to different frequency bands, the bandwidth of which depends on the service requirements. In order to achieve high data rates, through a higher number of channels, the system bandwidth is specified up to 60 MHz (or higher) so that emerging multimedia services such as IPTV, HDTV, etc. can be supported.

FDM poses significant design challenges in the Analog Front-End (AFE), specifically on the receiver (RX) part of the AFE. Especially because it captures the complete used spectrum and the properties of the received signal spectrum depend on many (poorly known) factors. For this reason, conventional AFE architectures, designed for TDMA schemes, are not really suited to support FDM, while FDM will be required to support co-existence.

Conventional PLC transceivers employ a straightforward architecture in the RX path mainly consisting of a low-noise amplifier (LNA), a low-pass filter (LPF), a variable gain amplifier (VGA) and a high speed analog-to-digital converter (ADC) digitizing the complete frequency band, as shown in FIG. 8. This is a very good architecture for TDMA based communication, in which the available bandwidth is assigned to a single user in a certain timeslot. However in an FDM system, the spectrum is shared by a number of users, resulting in simultaneous communication channels, each having different properties. As a consequence, taking into account the powerline uncertainties and an FDM scheme, the requirements on AD converters are huge if a minimum SNR is required in bad conditions, especially for the next generation PLC systems up to 100 MHz (as considered in the IEEE P1901 working group).

In the prior art, solutions have been developed for particular FDM PLC systems without digitizing the full frequency band. These FDM front end solutions can be split into two groups. The first group carries out a frequency conversion to a high intermediate frequency (IF) followed by band-pass filters and subsampling. An example of the first group can be found in WO 2004/091113. A system and a method for data communication over a power line are presented. The up-conversion is carried out in the receiver path where the received signal is filtered by off-chip, fixed, expensive band-pass filters. Subsampling of the signal is done at a high intermediate frequency, which is sensitive to clock jitter. The system requires band-pass filters at high IF (order of 100 MHz). At higher frequencies, the required Quality factor is higher in order to achieve the same amount of channel filtering, which makes the band-pass filters less effective at higher frequencies due to technological limitations. Furthermore, band-pass filters at high IF (order 100 MHz) cannot be integrated on chip with good noise and linearity performance, which is important from a cost point of view.

The other group uses simple fixed band-pass filters followed by subsampling Analog-to-Digital conversion, without applying a frequency conversion (e.g., U.S. Patent Publication No. 2002/186715). The fixed band-pass filters provide very little flexibility for the channel allocations. This is a disadvantage because the channel characteristics are unknown and changing with time. Moreover, co-existence with other systems requires flexibility to allocate the channels because other systems could use different channels widths, or different center frequencies. Band-pass filters cannot be integrated as good as low-pass filters (filter order, noise, distortion, complexity, power consumption etc.).

Prior art power line AFEs, which require supporting FDM, are not optimized for best performance (higher SINAD, dynamic range, robustness against interferers) and ASIC integration.

SUMMARY

The present invention relates to communications over a power line distribution network. More particularly, the invention is part of a communication system like for example a modem architecture developed for a power line system. The architecture comprises a transmitter and a receiver.

A system and a method are disclosed herein for processing an incoming broadband power line signal, whereby the signal comprises different frequency channels, noise and interfering signals. The incoming broadband power line signal is being processed into a signal which comprises the frequency channel of interest such that it can be filtered and amplified with a maximum SINAD (Signal Including Noise And Distortion) and dynamic range, even in the presence of interferers. Furthermore, a system and a method are provided which can be integrated on chip without performance penalty.

A system is disclosed for receiving signals over a power line distribution. Typically, problems of noise and interference have been addressed at the receiver side. However, a system as described herein is not limited to the receiver-side solution. The systems disclosed herein may also be used at the transmitter side. The receiver comprises a high pass filter, a preselect crossover filter, and an analog front-end receiver architecture.

The high pass filter is present to remove strong unwanted signals at low-frequency caused by, for example, AM radio. The preselect crossover filter divides the spectrum into a number of frequency bands. Such preselect filtering provides significant rejection of interfering signals in other frequency bands such that intermodulation distortion caused by non-linearities is minimized. Robustness against interferences or blockers is one of the main advantages of systems as described herein, because signals in other frequency bands will be filtered in an early stage in the AFE, thus reducing intermodulation distortion between the strong interferer and the channel of interest.

The analog front-end receiver architecture performs mixing, low-noise amplification, frequency conversion to zero-IF or low-IF and channel filtering. The LNA can be switched to every preselect frequency band. The filters present in the front-end are fully integrated for low cost and they may be tuneable, providing a flexible way to allocate a certain amount of bandwidth to specific users or services. The filters present are low pass filters (LPF) and therefore can operate with a low Q factor. In the solutions of the prior art, bandpass filters with a high Q factor are used in the receiver. Another advantage of using a zero-IF or low-IF architecture is that the magnitude of the image frequencies is approximately known because these are in the same frequency channel.

After the mixing to baseband, the filtering and amplification takes place at a low frequency. Therefore, these blocks can be optimized to a higher linearity due to the feedback operation, compared to circuits operating at a high intermediate frequency. A system as described herein further comprises an Analog-to-Digital converter. The AD conversion is performed in baseband, minimizing the AD clock frequency which also relaxes the specifications on AD clock jitter. An image reject filter is not needed because an image reject mixer is used (partly implemented in the digital domain).

The architecture can be quite easily upgraded for power line systems exploiting higher bandwidth (e.g. 100 MHz, the current design works up to 60 MHz). It only requires an upgrade of the low noise amplifier and the mixer.

In a preferred embodiment, the LPF and the VGA of the transmitter and the RX-architecture of the receiver are integrated in an ASIC, whereas the Line driver, the HPF and the preselect filter were implemented in discrete components. In another embodiment, these discrete designs can also be added to the ASIC, as well the ADCs and the DACs, resulting in a fully integrated system on a chip. This reduces the cost due to the high level of integration.

In another embodiment, the LNA is being bypassed by a multiple of attenuators. The LNA is usually the first active stage of the receiver front-end. At the input of the receiver, the incoming signal is being divided in a number of frequency bands. As a consequence, the variable gain amplifier is provided with the ability to switch between the different frequency channels depending on the frequency range of interest. Besides providing gain and low noise figure, the LNA should also present a good linearity and input impedance matching. In case the input spectrum contains strong interferers, it is even desired to attenuate the input signal until the interferers are sufficiently filtered in the IF filter to avoid excessive intermodulation distortion. For this purpose the LNA can be bypassed by an attenuator.

In another embodiment, the attenuator comprises a ladder network with a multiple of attenuation sections. Other topologies are possible as well, however, it is important to avoid switches at the inputs.

In another embodiment, the LNA comprises a multiple of gain stages whereby the amplifier sections that are not used should be bypassed in order to reduce noise and intermodulation distortion inherent when adding a next stage.

In another embodiment, the IF filter is a Gm-C filter, accompanied by a calibration circuitry, that can be tuned over at least one decade. A possible calibration circuitry comprises a frequency controller, giving a frequency stabilization loop.

These as well as other aspects and advantages will become apparent to those of ordinary skill in the art by reading the following detailed description, with reference where appropriate to the accompanying drawings. Further, it is understood that this summary is merely an example and is not intended to limit the scope of the invention as claimed.

BRIEF DESCRIPTION OF THE DRAWINGS

Presently preferred embodiments are described below in conjunction with the appended drawing figures, wherein like reference numerals refer to like elements in the various figures, and wherein:

FIG. 7 shows schematically a switched capacitor frequency stabilization loop.

FIG. 8 shows schematically a conventional analog front end architecture.

DETAILED DESCRIPTION

Figure 1:
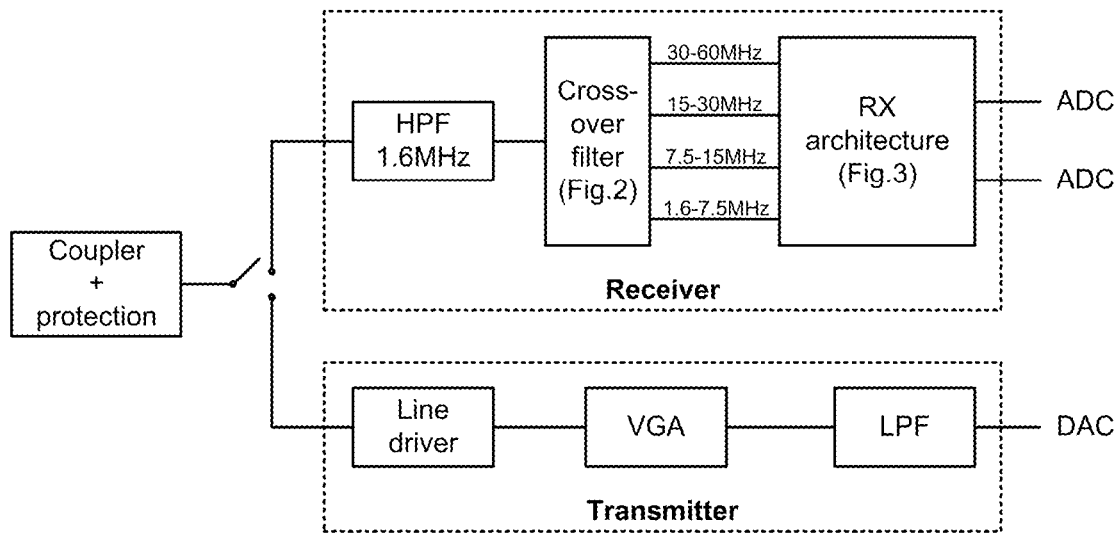
FIG. 1 shows schematically the proposed analog front end.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

The invention relates to systems and methods for broadband communication over a power line distribution network. This network comprises medium voltage links, the area between the low-voltage transformer station and the house connection and/or the electricity distribution in the house. More specifically, the systems disclosed herein may form part of a modem developed for a power line system based on Frequency Division Multiplexing (FDM). FDM is a particularly straightforward way to achieve co-existence between different PLC systems and to achieve robustness against interferers received by the power line cabling.

FDM is often criticized on the basis that it would require more complex front-ends to address the near/far problem that would affect the dynamic range [1]. On the other hand, FDM is undoubtedly the most straightforward way to achieve co-existence between different PLC systems, even Homeplug AV includes the possibility of using FDM for coexistence [1]. On the other hand, FDM will always pose significant design challenges in the Analog Front-End (AFE). This disclosure mainly focuses on the receiver (RX) part of the AFE, since this is the most critical part. Especially because it captures the complete used spectrum and the properties of the received signal spectrum depend on many (poorly known) factors. For this reason, conventional AFE architectures, designed for TDMA schemes, are not really suited to support FDM, while FDM will be required to support co-existence. Conventional PLC transceivers, employ a straightforward architecture in the RX path mainly consisting of a low-noise amplifier (LNA), a low-pass filter (LPF), a variable gain amplifier (VGA) and a high speed analog-to-digital converter (ADC) digitizing the complete frequency band as shown in FIG. 8. This is a very good architecture for TDMA based communication, in which the available bandwidth is assigned to a single user in a certain timeslot. However in a FDM system, the spectrum is shared by a number of users resulting in simultaneous communication channels, each having different properties. As a consequence, AD conversion of the entire band is not a robust solution in an FDM system as mentioned in the background section.

It is an aim to provide a system and method for processing an incoming broadband power line signal, consisting of different frequency channels, noise and interfering signals, into a signal which includes the frequency channel of interest such that it can be filtered and amplified with a maximum SINAD and dynamic range, even in the presence of interferers. It is also an aim to provide a system and method, which can be integrated on chip without performance penalty.

Figure 2:
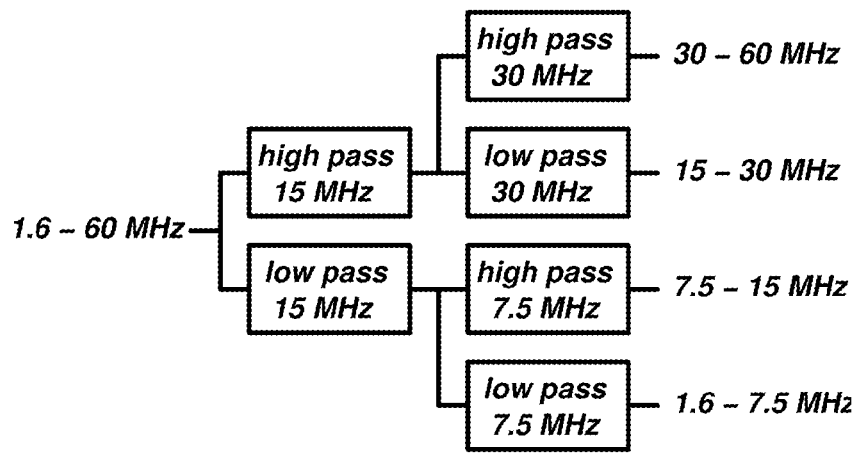
FIG. 2 shows schematically an example of a crossover filter.
Figure 3:
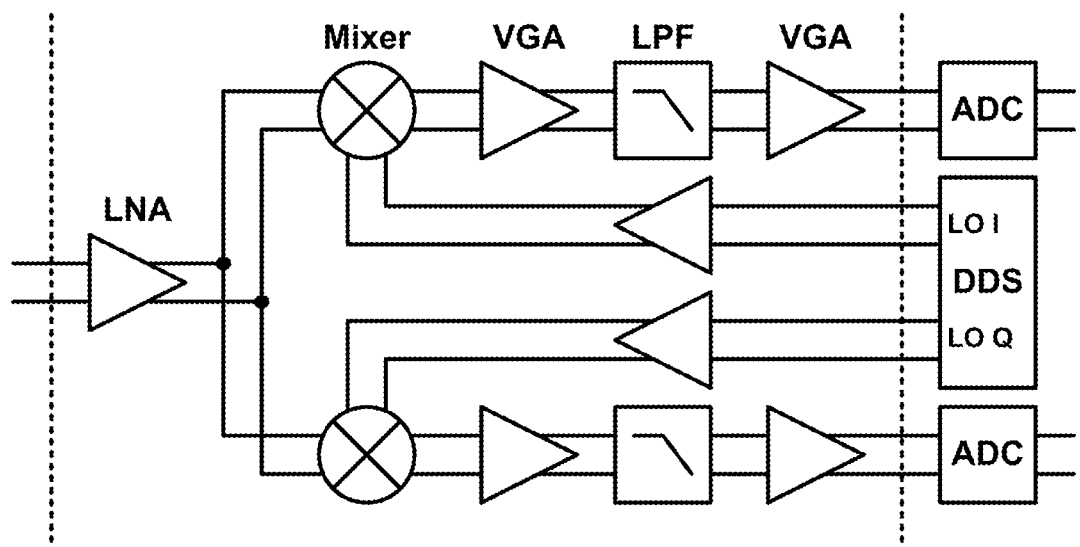
FIG. 3 shows schematically the proposed RX architecture.

The system is in fact a hybrid solution comprising the following components (as shown in FIG. 1):

1. A high pass filter (HPF, e.g. at 1.6 or 2 MHz depending on the standard) to remove the strong unwanted signals at low-frequency caused by e.g. AM radio, switchers . . . . (This is standard practice)
2. A preselect crossover filter to divide the spectrum above 1.6 or 2 MHz in a number (e.g. 4) of frequency bands (as shown in FIG. 2). These preselect frequency bands contain one or more FDM channels. The preselect filtering reduces intermodulation distortion caused by strong interferers or other communication channels because the unwanted signals are (partly) attenuated before attenuation.
3. The AFE RX architecture which basically performs low-noise amplification (or attenuation), frequency conversion to zero-IF or low-IF and channel filtering. The block diagram is shown in FIG. 3. The LNA can be switched to every preselect frequency band.

The architecture and functionality of the AFE is new in PLC equipment compared to prior art solutions and provides some interesting advantages such as fully integrated filters for low-cost. Moreover, the filters have a tuneable bandwidth providing an extra degree of freedom. Other innovations are at the transistor level.

The system can also be implemented in other ways e.g. the HPF could be part of the coupler. The crossover filter can be active, passive, can be omitted or included in the RX architecture as well and the preselect filter could also include notch filters, however, it is important that it is more linear than the RX architecture, otherwise it does not improve the performance.

As shown in FIG. 1 the transmit path is similar to conventional architectures.

The application of a "zero-IF" or a "low-IF" RX architecture in the AFE transceivers in power line systems is new. Such architectures use down-conversion in the receive path so that low-pass filters (instead of band-pass filters, which are used in the closest prior art solution) can be used for channel filtering.

In an embodiment, the LPF and the VGA of the transmitter and the RX-architecture of the receiver are integrated in an ASIC, whereas the Line driver, the HPF and the preselect filter were implemented in discrete components, however, these discrete designs can also be added to the ASIC, as well the ADCs and the DACs, resulting in a fully integrated system on a chip.

Figure 4:
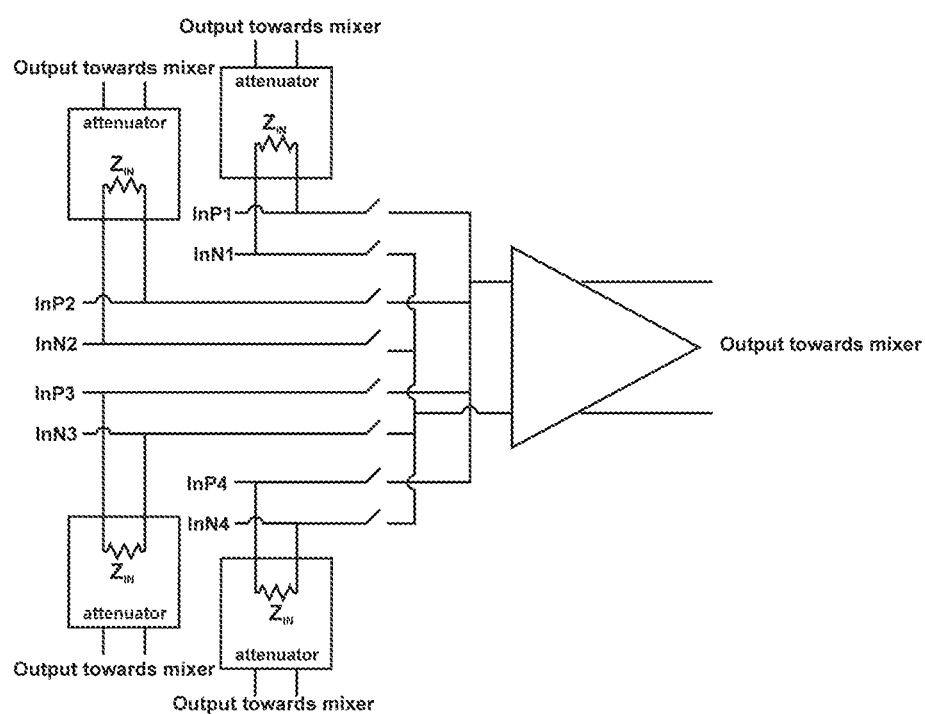
FIG. 4 shows a specifically LNA architecture.

In the embodiment of the RX architecture the low noise amplifier is specifically optimized for this architecture and to achieve a maximum dynamic range (about 100 dB for 2 MHz channels), through a number of circuit innovations. The low noise amplifier is usually the first active stage of the receiver front-end. At the input of the receiver there is a preselect filter that divides the frequency range in a number (e.g. 4) frequency bands. As a consequence, the LNA has to switch between the different frequency channels depending on the frequency range of interest. One could use a dedicated LNA, or a complete architecture for every frequency band, however, a solution using only a single LNA consumes less chip area. Besides providing gain and low noise figure, the LNA should also present a good linearity and input impedance matching. In case the input spectrum contains strong interferers, it is even desired to attenuate the input signal until the interferers are sufficiently filtered in the IF filter to avoid excessive intermodulation distortion. For this purpose the LNA can be bypassed by an attenuator. The LNA architecture is shown in FIG. 4.

As the attenuator should handle the highest input signals, the position of switches is very critical for the linearity because switches are active elements and consequently non-linear. For this reason a dedicated attenuator is used for every preselect frequency band (so that no switching is required), each in parallel with the LNA, avoiding switches at the input of the attenuator. In this configuration the attenuators also act as termination resistors for the preselect filter (or transmission lines). The outputs of the four attenuators are connected to the mixers via switches. At the output of an attenuator the signal level is significantly lower (compared to the input level), so that the impact of these switches is also much lower. Switches at the input of the LNA (having a very high input impedance) are also less critical so the architecture has only one LNA that can be switched to the 4 preselect channels. Moreover, putting several LNAs would consume more chip area. The output of the LNA is also connected to the mixer via switches.

Figure 5:
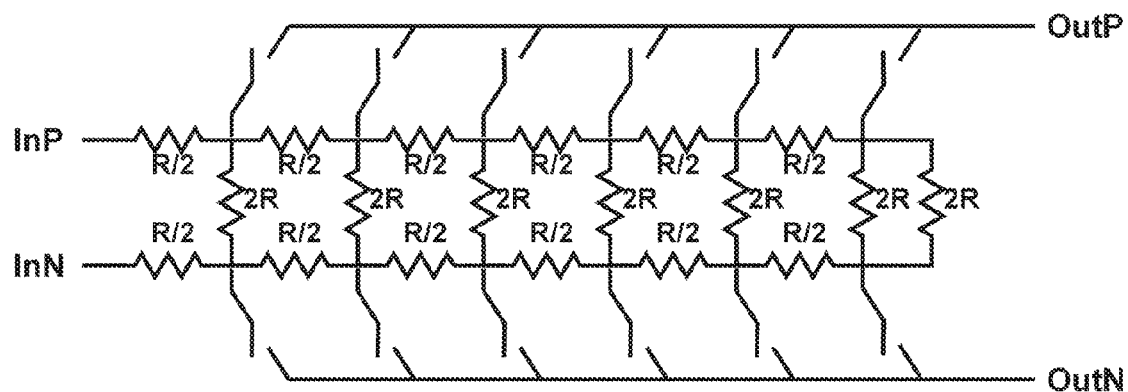
FIG. 5 shows a possible embodiment of an attenuator.

In the embodiment the attenuator consists of a ladder network with 6 sections, as shown in FIG. 5. Each section has an attenuation of 6 dB, so that the attenuation can be set from −6 to −36 dB. The differential input impedance of the attenuator is R. Other topologies are possible as well, however, it is important to avoid switches at the inputs (InP, InN).

The attenuator extends the dynamic range towards very strong input signals as shown by the following simulation result. Two tones of 2.5 Vpp (12 dBm, so 5 Vpp in total or 18 dBm), and an attenuation setting of 18 dB gives a $3^{rd}$ order intermodulation distortion (IM3) of −80.6 dBc typical, showing that the 1 dB compression point is even much higher than 18 dBm.

Figure 6:
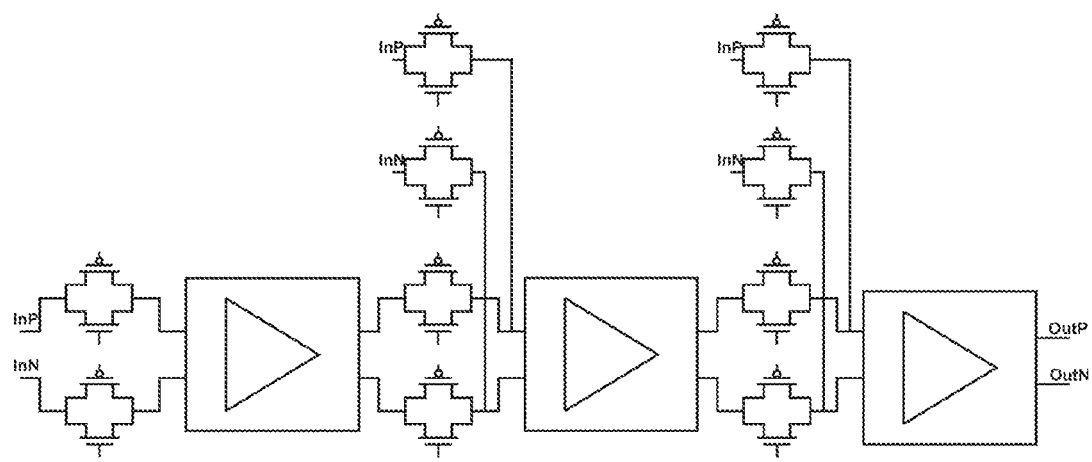
FIG. 6 shows schematically a 3-stage low noise variable gain amplifier.

In an embodiment the LNA consists of 3 gain stages as shown in FIG. 6. Since every stage adds noise and intermodulation distortion, the amplifier sections that are not used should be bypassed (instead of setting the gain to 0 dB). Each stage has a variable gain up to 12 dB in steps of about 1 dB, so that the maximum gain is about 35 dB. A multi-stage design was preferred because a single amplifier, with the same gain range and gain step size, is more complex, which is disadvantageous for the stability of feedback loops, especially in broadband amplifiers.

In an embodiment the IF filter is a Gm-C filter that can be tuned over one decade. This also involves circuit innovations, especially in the frequency stabilization loop. Gm-C filters are constructed by replacing the inductor in an LC filter with a capacitor and a gyrator made with a transconductance amplifier. Typically Gm-C filters provide lower noise and lower power in a given process than switched-capacitor filters [2] but a disadvantage is their need for some sort of calibration circuitry [3]. Calibration is required because their filter coefficients are determined by the product of two dissimilar elements, such as capacitor and resistor (or transconductance) values. In the case of a Gm-C filter, the corner frequency is proportional to the ratio of the transconductance gm to the integrating capacitance C [4]. The accuracy of the corner frequency is initially about 30 percent, but a control loop can reduce this number significantly. Usually the transconductance is used as the tuning parameter to change the corner frequency. The frequency controller design is based on a charge balance principle [5]. However, the embodiment is more accurate than prior art solutions due to the addition of a feedback variable gain amplifier. FIG. 7 shows the single ended version of the controller for clarity, but the implementation can be differential as well, as is the case in the embodiment.

Ideally, in this controller, the charge on the integrating capacitor $C_1$ is described by the following charge conservation equation:

$$C_1V_{o2}(t)=(t-t_0)NI_R-(C_1V_{C1}(t_0))_{\phi2}+C_1V_{o2}(t_0)$$

With $V_{o2}(t_0)$ the initial op amp output voltage. The first term of this expression corresponds to the extracted charge by the current source $NI_R$. The second term is the injected charge, during $\phi2$, from the capacitor $C_1$ into $C_1$. If the time constants are sufficiently large to charge and discharge $C_1$, the total injected charge, $C_1V_{C1}(t_0)$, is equal to $C_1V_{o1}(t_0)$. The voltage, $V_{o1}$ is determined by the DC current source, $I_R$, and the transconductance $G_m$ as $V_{o1}=I_R/G_m$. The transconductance is adjusted by the control voltage $V_{fb}$. In a steady state condition, the injected charge equals the extracted charge in every clock period. The loop steady-state condition can be expressed as $$\frac{G_m}{C_1} = \frac{f_{clock}}{N}$$

The bandwidth of a Gm-C filter is proportional to the ratio of the transconductance over the capacitance. So by keeping Gm over $C_1$ constant, this feedback loop can stabilize the 3 dB corner frequency of the IF filter. The frequency stabilisation loop also corrects the desired 3 dB corner frequency for non-idealities when the bandwidth setting is changed e.g. between 1, 2, 4 or 8 MHz. Previous solutions do not have a correction scheme, so that our new idea is more accurate because the bandwidth of a Gm-C filter is not perfectly proportional to Gm/C and at higher frequencies (close to the corner frequency) the performance of the transconductors Gm degrades. The correction is done by changing the gain of the feedback amplifier in FIG. 7. The amplifier amplifies the output of the integrator (consisting of Gm and $C_1$) with a small correction factor so that the output of the amplifier is equivalent to an integrator having the correct Gm. The feedback amplifier is followed by a buffer to drive the switches. In the low-pass filter itself the bandwidth is changed by switching the capacitors, instead of the transconductors (which are controlled by the $V_{fb}$ voltage shown in FIG. 7) because that yields better noise performance.

As input clock frequency, the same clock of the ADCs following the AFE are used. With this reference choice, any clock feedthrough is aliased to DC after the digital to analog conversion. At DC there is no useful information anyway due to the offset compensation. Two possible clock frequencies are supported: 32 MHz to be able to sample the 8 MHz bandwidth and 16 MHz for the other filter bandwidths (1, 2, and 4 MHZ). To minimize possible risks with the frequency tuning, it is possible to bypass the automatic control loop and tune the filter with an external tuning voltage.

Each of the following documents in this reference list are hereby incorporated by reference in their entirety:

[1] Intellon, "Homeplug AG Technology Overview", 2005.
[2] "Sampling IF Filters and the Return of the Superheterodyne Receiver", S. Dell'Aera and T. Riley, Microwave Journal, November 2005
[3] Analog Integrated Circuit Design, D. Johns and K. Martin, John Wiley & Sons, 1997, ISBN 0-471-14448-7
[4] A 4 MHz CMOS Continuous-Time Filter with On-Chip Automatic Tuning, F. Krummenacher and N. Joehl, IEEE Journal of Solid-State Circuits, June 1988, vol. 23, no. 3
[5] A 10.7-MHz 68-dB SNR CMOS Continuous-Time Filter with On-Chip Automatic Tuning, J. Silva-Martinez, M. Steyaert and W. Sansen, IEEE Journal of Solid-State Circuits, December 1992, vol. 27, no. 12

The invention claimed is:

1. A power line communication system for receiving a power line communication signal being a frequency-division multiplexed signal, the system comprising:
a crossover filter for distributing the received power line communication signal over a number (N) of frequency bands, where N>=2; and
a low-noise amplifier configured to receive the N frequency bands as inputs and generate an output for each of the N frequency bands, the low-noise amplifier comprising:
N attenuators, each attenuator configured with an output switch, wherein each attenuator of the N attenuators is configured to receive one predetermined frequency band of the N frequency bands as an input and generate an attenuated output of the one predetermined frequency band of the N frequency bands, wherein each output switch of the N attenuators is configured to receive and switch the attenuated output;
a single amplifier, placed in parallel with the N attenuators, configured to generate an amplified output for an input frequency band, and
at least N switches configured to switch the input frequency band to the single amplifier between the N frequency bands,
wherein, in response to a given frequency band containing a strong interferer, the low-noise amplifier is configured to provide the attenuated output of an attenuator associated with the given frequency band via the output switch of the attenuator associated with the given frequency band, and
wherein, in response to the given frequency band not containing a strong interferer, the low-noise amplifier is configured to provide the amplified output of the single amplifier for the given frequency band.

2. A power line communication system as in claim 1, further comprising an analogue-to-digital converter for converting the filtered frequency-division multiplexed signal at the intermediate frequency.

3. A power line communication system as in claim 1, further comprising a frequency conversion circuit for converting the received power line communication signal to a signal at an intermediate frequency.

4. A power line communication system as in claim 3 further comprising: a low-pass filter, wherein the low-pass filter is adapted for performing channel filtering on the frequency-division multiplexed signal at the intermediate frequency.

5. A power line communication system as in claim 4, wherein the low-pass filter is a Gm-C filter.

6. A power line communication system as in claim 5, further comprising a calibration circuit for adapting the cut-off frequency of the Gm-C filter.

7. A power line communication system as in claim 6, wherein the calibration circuit is a stabilization loop comprising a variable gain amplifier, the stabilization loop being arranged for updating filter parameters due to non-idealities.

8. A power line communication system as in claim 3, wherein the single amplifier comprises a plurality of gain stages.

9. A power line communication system as in claim 1, further comprising at least one Variable Gain Amplifier for optimizing the level of the power line communication signal.

10. A power line communication system as in claim 1, further comprising a high pass filter for pre-filtering the power line communication signal.

11. A power line communication system as in claim 1, wherein the single amplifier is connected in parallel to the N attenuators.

12. A power line communication system as in claim 11, wherein at least one attenuator of the N attenuators comprises a ladder network with a plurality of attenuation sections.

13. A power line communication system as in claim 1 further arranged for transmitting a power line communication signal.

14. A power line communication system as in claim 1, wherein the system is fully integrated on chip.

15. A method for receiving a power line communication signal, over a power line, the communication signal being a frequency-division multiplexed signal, comprising:
   filtering the received power line communication signal with a crossover filter for distributing over a plurality of frequency bands; and
   for each frequency band of the plurality of frequency bands:
      receiving the frequency band as an input for an attenuator dedicated to the frequency band,
      generating an amplified output for an input frequency band using a single amplifier,
      switching the input frequency band to the single amplifier between the frequency bands,
      generating an attenuated output for the frequency band using the attenuator dedicated to the frequency band when the frequency band contains a strong interferer via an output switch, wherein the output switch is configured to receive and switch the attenuated output, and
      generating an amplified output for the frequency band when the frequency band does not contains the strong interferer via the single amplifier for all frequency bands of the plurality of frequency bands.

16. The method of claim 15, further comprising:
amplifying the power line communication signal.

17. The method of claim 15, further comprising:
switching a low noise amplifier to each of the plurality of frequency bands.

18. The method of claim 15, further comprising:
adjusting the level of the power line communication signal with a Variable Gain Amplifier.

* * * * *